US007996776B2

(12) United States Patent
Parker et al.

(10) Patent No.: US 7,996,776 B2
(45) Date of Patent: Aug. 9, 2011

(54) SHARED TELEPOINTER

(75) Inventors: Cameron J. Parker, Sammamish, WA (US); Joseph T. Fletcher, Seattle, WA (US); Mehal H. Shah, Bellevue, WA (US); Solomon M. Bisker, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 11/364,575

(22) Filed: Feb. 27, 2006

(65) Prior Publication Data
US 2007/0204047 A1 Aug. 30, 2007

(51) Int. Cl.
G06F 17/00 (2006.01)
G06F 3/00 (2006.01)

(52) U.S. Cl. ........................ 715/753; 715/201
(58) Field of Classification Search .................. 715/753, 715/201
See application file for complete search history.

(56) References Cited

U.S. PATENT DOCUMENTS

| 5,689,668 | A  | * | 11/1997 | Beaudet et al. ............... 715/841 |
| 5,920,694 | A  |   | 7/1999  | Carleton et al. |
| 6,346,933 | B1 |   | 2/2002  | Lin |
| 6,351,777 | B1 | * | 2/2002  | Simonoff ...................... 709/250 |
| 6,538,643 | B2 |   | 3/2003  | Mori et al. |
| 6,745,163 | B1 |   | 6/2004  | Brocious et al. |
| 6,859,909 | B1 |   | 2/2005  | Lerner et al. |
| 7,024,456 | B1 | * | 4/2006  | Simonoff ...................... 709/205 |
| 7,032,006 | B2 | * | 4/2006  | Zhuk ............................ 709/206 |
| 7,043,529 | B1 | * | 5/2006  | Simonoff ...................... 709/205 |
| 7,222,305 | B2 | * | 5/2007  | Teplov et al. ................. 715/751 |
| 7,234,117 | B2 | * | 6/2007  | Zaner et al. .................. 715/758 |
| 7,275,212 | B2 | * | 9/2007  | Leichtling .................... 715/733 |
| 7,287,054 | B2 | * | 10/2007 | Lee et al. ..................... 709/204 |
| 7,899,915 | B2 | * | 3/2011  | Reisman ....................... 709/228 |
| 2001/0044827 | A1 | * | 11/2001 | Zhuk ........................... 709/205 |
| 2003/0229900 | A1 | * | 12/2003 | Reisman ........................ 725/87 |
| 2004/0031050 | A1 | * | 2/2004  | Klosterman .................... 725/39 |
| 2004/0194139 | A1 |   | 9/2004  | Rao et al. |

(Continued)

FOREIGN PATENT DOCUMENTS
WO   WO2005/096128   10/2005

OTHER PUBLICATIONS

CELTX, "Fast-Forward Your Product," Celtx—Product Indepth, Copyright 2002-2006 celtx (2 pages).
Seminar Abstract, School of CIT—Seminar Abstract, Internet Computing Research Group Seminar Series, May 2001 (1 page) Accessed Jan. 16, 2006 http://ecommerce.cit.gu.edu.au/ict/events/seminars/abstracts/2001.

(Continued)

Primary Examiner — Doug Hutton
Assistant Examiner — Soumya Dasgupta
(74) Attorney, Agent, or Firm — Perkins Coie LLP

(57) ABSTRACT

A facility is described for providing shared telepointers and for enabling hosts and participants to highlight portions of documents or applications using the shared telepointers. In various embodiments, the facility establishes a sharing session wherein an application executing on a host computing device is shared with a participant computing device, receives at the host computing device an indication from a participant computing device to identify a region to users in the sharing session, draws the identified region on a display device associated with the host computing device, and causes the identified region to be drawn on a display device associated with the participant computing device. In various embodiments, the region is a spot region or a highlighted region that is drawn in a color associated with a user of the participant computing device.

16 Claims, 18 Drawing Sheets

U.S. PATENT DOCUMENTS

| | | |
|---|---|---|
| 2005/0027702 A1 | 2/2005 | Jensen et al. |
| 2005/0034075 A1 | 2/2005 | Riegelman et al. |
| 2005/0091571 A1* | 4/2005 | Leichtling .................... 715/500 |
| 2007/0124737 A1* | 5/2007 | Wensley et al. ............... 719/314 |
| 2009/0319672 A1* | 12/2009 | Reisman ....................... 709/227 |
| 2009/0320073 A1* | 12/2009 | Reisman ......................... 725/51 |

OTHER PUBLICATIONS

Zipper, Bernd, "PDF Collaboration: WebDAV in Action," Planet PDF, Jul. 3, 2001 (10 pages).

* cited by examiner

SHARED TELEPOINTER

BACKGROUND

Users of computing devices can collaboratively author or modify documents using collaborative document authoring systems. Collaborative document authoring systems generally include a host computing device and one or more participant computing devices that are all interconnected via a network, such as the Internet or an intranet. Collaborative authoring systems enable their users to share visual representations of an application, such as MICROSOFT WORD, MICROSOFT EXCEL, and so forth. As an example, a user of a host computing device ("host") can share an application with users of participant computing devices ("participants"). The shared application and documents that the shared application displays on a host computing device's display device are also visible on display devices corresponding to participant computing devices. Any changes made to the document by any of the users are displayed to all participants and the host. Some collaborative document authoring systems may enable one user to "take control" such that only the user taking control can modify the document.

The host and participants may collaborate using multiple media forms. As an example, during document authoring or editing, the host and participants may be able to communicate orally (e.g., by using Voice over Internet Protocol, a common telephone, and so forth) while using the shared application. The host and participants may also be able to communicate by typing messages, such as in an Instant Messenger window. When the host and participants are collaborating, they may refer to portions of a document. As an example, a participant may indicate to the host and other participants that a particular portion of a document needs a revision.

SUMMARY

A facility is described for providing shared telepointers and for enabling hosts and participants to highlight portions of documents or applications using the shared telepointers. A shared telepointer is a mouse pointer (or other object that can be used to identify a visible region of a screen) that can be controlled remotely and viewed by users of multiple computing devices. As an example, a host may point to a portion of a document and a participant can point to another portion of the document. The host, the participant pointing to the other portion of the document, and the other participants can see on their display devices both telepointers and both portions of the document pointed to and can identify which telepointer is being controlled by which user. The facility enables users to identify which telepointer corresponds with which user by associating a different color or shade with each user's telepointer and providing the user's identification (e.g., name or electronic mail alias) in a name region that appears near the telepointer. When a user selects a region on the shared application using the telepointer, the facility can cause the display associated with users' computing devices to indicate which region was selected. As an example, a participant can highlight a region of a shared application or a document contained therein by clicking a mouse button. When the participant clicks the mouse button, a circular region ("spot") surrounding the location indicated by a mouse telepointer is highlighted. When the participant clicks the mouse button and then drags the mouse pointer, a region corresponding to the path taken by the mouse pointer during the dragging is highlighted. The highlighted region may then be displayed on the display devices associated with the host and participant computing devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
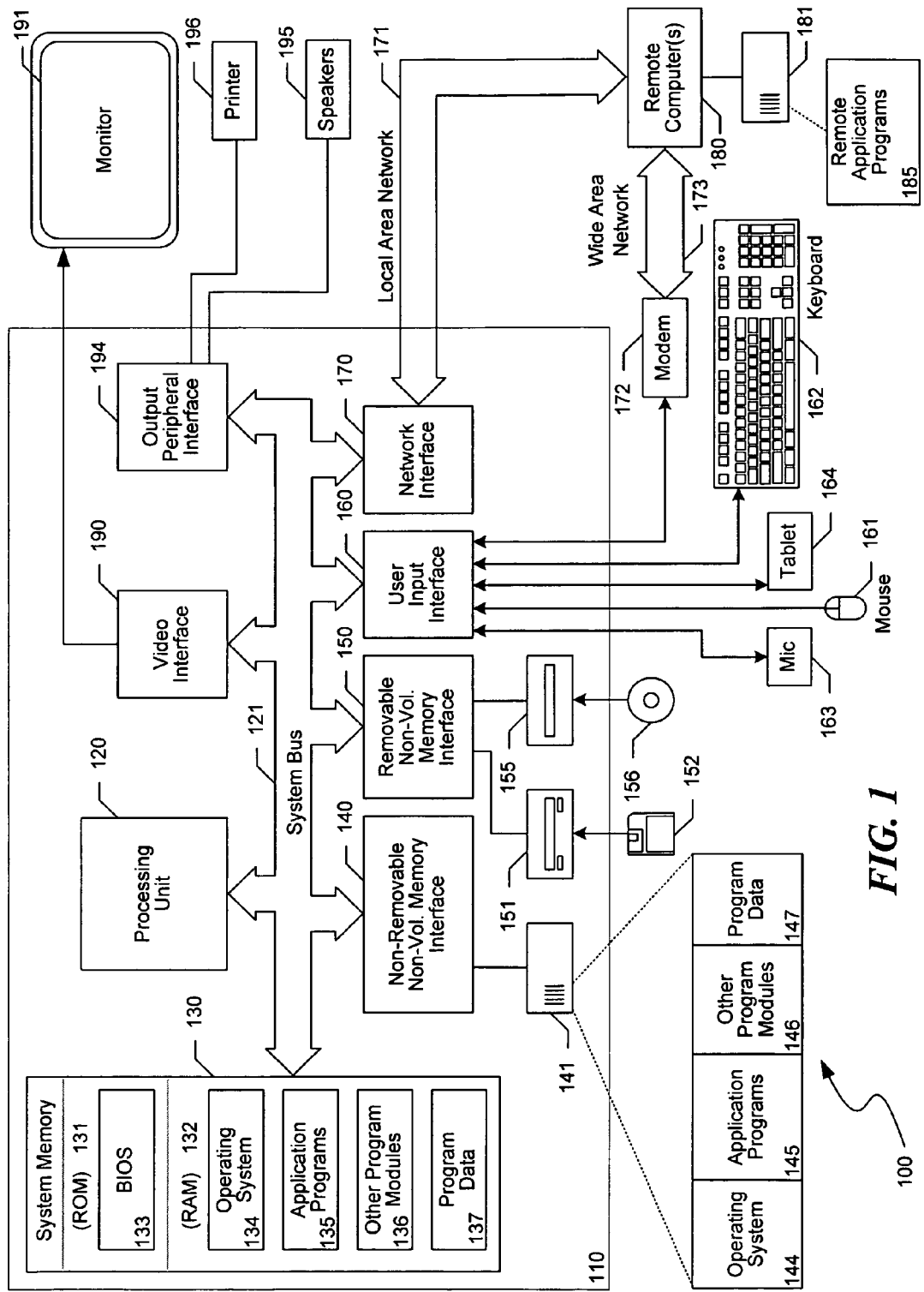
FIG. 1 is a block diagram illustrating an example of a suitable computing environment in which the facility may operate.

A facility is described for providing shared telepointers and for enabling hosts and participants to highlight portions of documents or applications using the shared telepointers. A shared telepointer is a mouse pointer (or other object that can be used to identify a visible region of a screen, such as simply a visible shape surrounding a participant's name, or simply the participant's name) that can be controlled remotely and viewed by users of multiple computing devices. As an example, a host may point to a portion of a document and a participant can point to another portion of the document. The host, the participant pointing to the other portion of the document, and the other participants can see on their display devices both telepointers and both portions of the document pointed to and can identify which telepointer is being controlled by which user. The facility enables users to identify which telepointer corresponds with which user by associating a different color or shade with each user's telepointer and providing the user's identification (e.g., name or electronic mail alias) in a name region that appears near the telepointer. When a user selects a region on the shared application using the telepointer, the facility can cause the display associated with users' computing devices to indicate which region was selected. As an example, a participant can highlight a region of a shared application or a document contained therein by clicking a mouse button. When the participant clicks the mouse button, a circular region ("spot") surrounding the location indicated by a mouse telepointer is highlighted. When the participant clicks the mouse button and then drags the mouse pointer, a region corresponding to the path taken by the mouse pointer during the dragging is highlighted. The highlighted region may then be displayed on the display devices associated with the host and participant computing devices.

In some embodiments, the facility uses the color associated with the telepointer that was used to select the region to highlight the region. As an example, if a user associated with the color blue highlights a region, the highlighted region may appear in a blue shade. In some embodiments, the facility uses an alpha blending technique to shade the region blue. When alpha blending a pixel to highlight color, existing colors of the pixel are mathematically transformed to increase the highlighting color for the pixel. In some embodiments, when the participant clicks the mouse button, the highlighted region may take on another shape besides a circle. Examples include rectangles, ovals, or other shapes. In various embodiments, the size of the highlight may vary.

In some embodiments, the highlight disappears after a period of time. As an example, the highlight may disappear three seconds after the user completed the selection or the highlight appears on the display device. The period of time may be varied, e.g., by a user.

In some embodiments, the highlight disappears when the host's pointer (or pointer of the participant who has taken control) moves over a highlight. As an example, if a participant has highlighted a horizontal region by clicking and dragging a telepointer, the facility would remove the highlight when the host's pointer touches or crosses the highlighted region. In some embodiments, the facility only removes a portion of the highlight intersecting with the path of the host's pointer. The facility may remove the highlight (or portion thereof) because there may be information in that region that cannot readily be discerned when alpha-blended to create a highlight.

In some embodiments, the telepointer may only be available to participants and not hosts. In such embodiments, the telepointers are employed by participants to indicate to hosts regions of interest in the shared application or its document.

In some embodiments, clicking and dragging the telepointer selects a rectangular highlight rather than a region that follows the path the telepointer took.

Turning now to the figures, FIG. 1 is a block diagram illustrating an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary computing system 110.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, routers, switches, access points, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media, including memory storage devices.

With reference to FIG. 1, an exemplary system for implementing the facility includes a general purpose computing device in the form of a computer 100. Components of the computer 100 may include, but are not limited to, a processing unit 120, a system memory 130, and a system bus 121 that couples various system components, including the system memory 130 to the processing unit 120. The system bus 121 may be any of several types of bus structures, including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as a Mezzanine bus.

The computer 100 typically includes a variety of computer-readable media. Computer-readable media can be any available media that can be accessed by the computer 100 and include both volatile and nonvolatile media and removable and nonremovable media. By way of example, and not limitation, computer-readable media may comprise computer storage media and communications media. Computer storage media include volatile and nonvolatile and removable and nonremovable media implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 100. Communications media typically embody computer-readable instructions, data structures, program modules, or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory, such as read only memory (ROM) 131 and random access memory (RAM) 132. A basic input/output system (BIOS) 133, containing the basic routines that help to transfer information between elements within the computer 100, such as during startup, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary computing system environment 110 include, but are not limited to, magnetic tape cassettes, flash memory cards, digital versatile disks, digital video tapes, solid state RAM, solid state ROM, and the like. The hard disk drive 141 is typically connected to the system bus 121 through a nonremovable memory interface, such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 100. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 100 through input devices, such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch-screen panel can be physically coupled to a housing in which the computer 100 is incorporated, such as in a tablet-type personal computer. In addition, computing devices such as the computer 100 may also include other peripheral output devices such as speakers 195 and a printer 196, which may be connected through an output peripheral interface 194 or the like.

The computer 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 100 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 100, or portions thereof, may be stored in the remote memory storage device 181. By way of example, and not limitation, FIG. 1 illustrates remote application programs 185 as residing on the memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
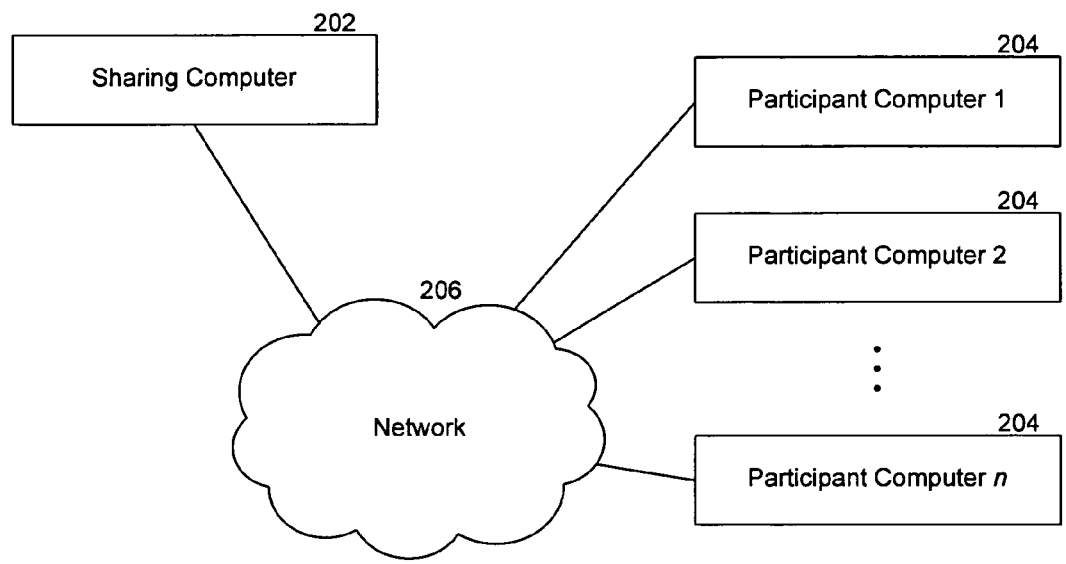
FIG. 2 is a block diagram illustrating an example of a suitable environment in which the facility may operate in some embodiments.

FIG. 2 is a block diagram illustrating an example of a suitable environment in which the facility may operate in some embodiments. The environment has at least one sharing computer 202 and can have one or more participant computers 204. A host uses a sharing computer. Participants use participant computers. The host and participant computers can be interconnected via a network 206, such as via the Internet or an intranet.

Figure 3:
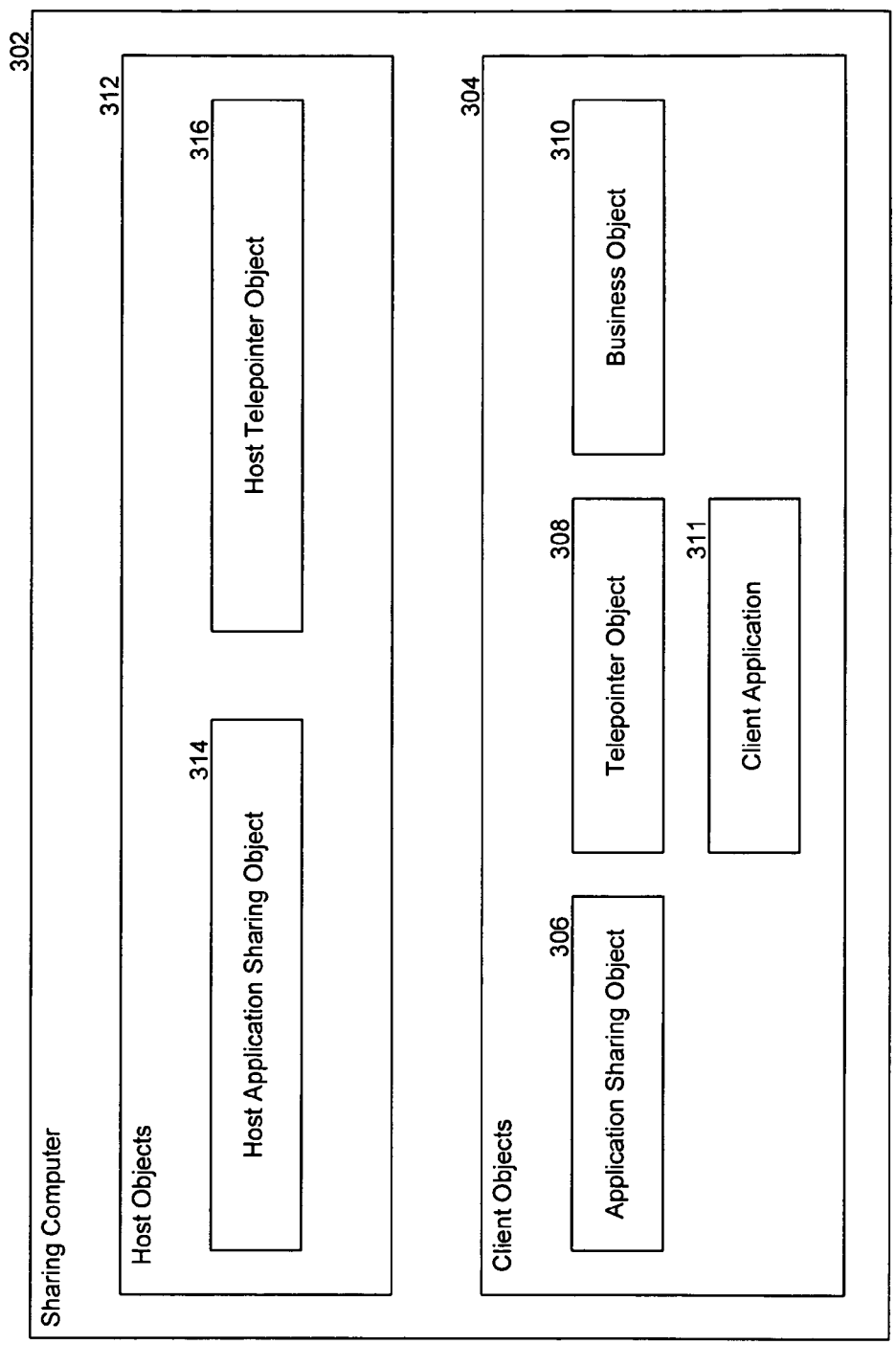
FIGS. 3-4 are block diagrams illustrating software components that the facility may employ in various embodiments.
Figure 4:
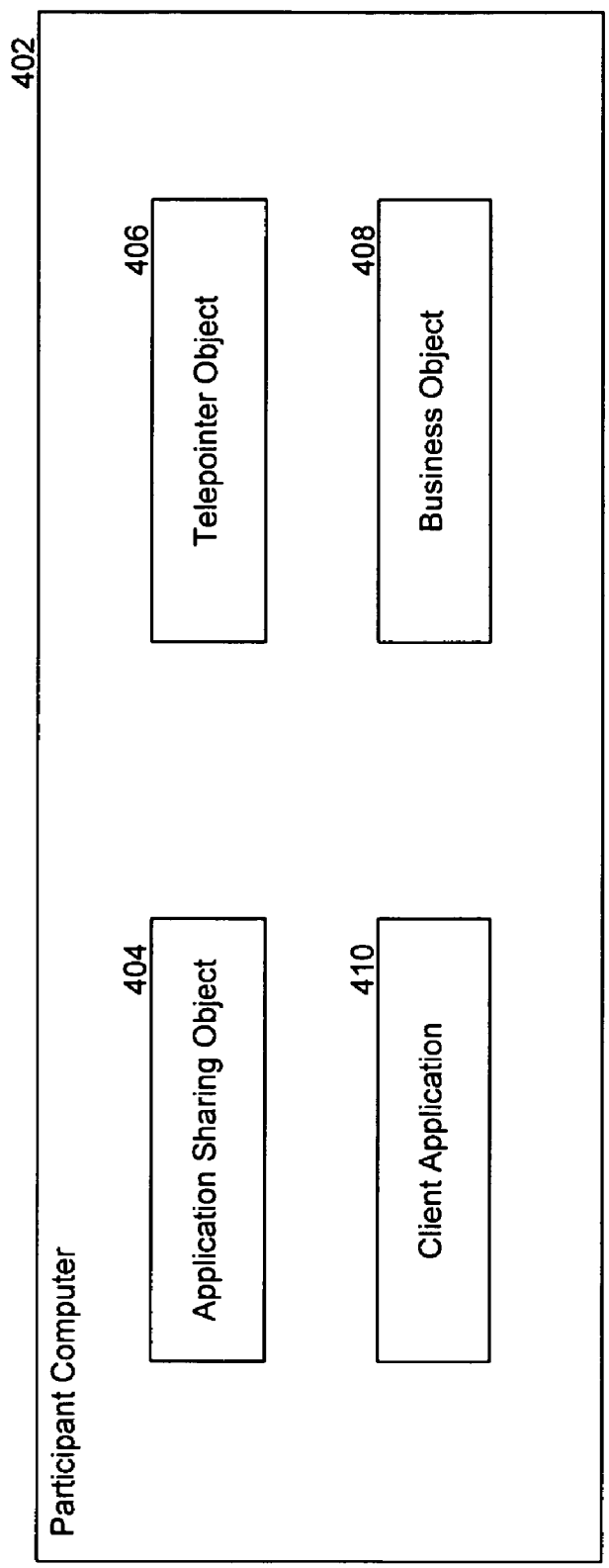

FIGS. 3-4 are block diagrams illustrating software components that the facility may employ in various embodiments. While some functionality of the software components is described below, the software components may also provide other functionality that is not specifically described.

FIG. 3 illustrates software components associated with the sharing computer 302. The software components can be classified as client objects 304 or host objects 312. The client objects are associated with a client application. The client application enables a host to share an application or document from the host computing device and enables a participant to participate in a sharing session using a participant computing device. A sharing session is the period of time during which a host and participants are collaborating.

The client objects comprise an application sharing object 306, telepointer object 308, telepointer business object 310, and client application 311.

When operating on a participant computer, the application sharing object receives window information from a host object operating on a sharing computer (e.g., a host computer), transforms the received window information, and provides the transformed window information to the client application. The application sharing object may transform the window information by scaling it so that the client application can display the window information. As an example, the client application may transform the window information from a shared coordinate system employed by the collaborative document authoring system to a scaled coordinate system that is employed by the client application. When operating on a sharing computer, the application sharing object collects window information and provides the collected window information to a host object for broadcasting to participant computers so that the participant computers can display appropriate information on their display devices.

When operating on a participant computer, the telepointer object receives mouse events and provides a filtered set of mouse events to a host object operating on a sharing computer. As an example, it may be unnecessary to provide a very granular set of mouse move events to other participants or the host because mouse pointer movement is less important than position. As a result, the telepointer object may send mouse move events after a specified period of time, such as every second, instead of whenever it receives a mouse move event. When operating on a sharing computer, the telepointer object receives mouse events from a host object and provides the mouse events to the operating system associated with the sharing computer so that appropriate action can be taken. As an example, the mouse events may invoke a command associated with the shared application.

The telepointer business object filters or transforms messages transferred between the telepointer object and other objects. As an example, the telepointer business object may determine that mouse events sent by some participants are to be ignored. As another example, the telepointer business object may determine that the mouse of one of the participants is idle and so that participant's telepointer should be removed from the display devices of other participants and the host.

The client application enables a host to share an application or document and enables a participant to participate in a sharing session. A participant employs the client application to view collaborative information sent by the host and other participants.

The host objects comprise a host application sharing object 314 and a host telepointer object 316.

The host application sharing object receives window information from an application sharing object operating on a sharing computer and broadcasts this information to application sharing objects operating on participant computers. Window information can include portions of images that are to be displayed. In some embodiments, the window information can include drawing commands.

The host telepointer object receives mouse events from a telepointer object operating on a participant computer and forwards the received mouse events to a telepointer object operating on a sharing computer. This enables the telepointer object operating on the sharing computer to take appropriate action, such as to invoke a command of a shared application, highlight a region, move a user's telepointer (e.g., shared telepointer), and so forth.

FIG. 4 illustrates software components associated with the participant computer 402. An application sharing object 404, telepointer object 406, telepointer business object 408, and client application 410 were discussed above in relation to the client objects of the sharing computer.

Figure 5:
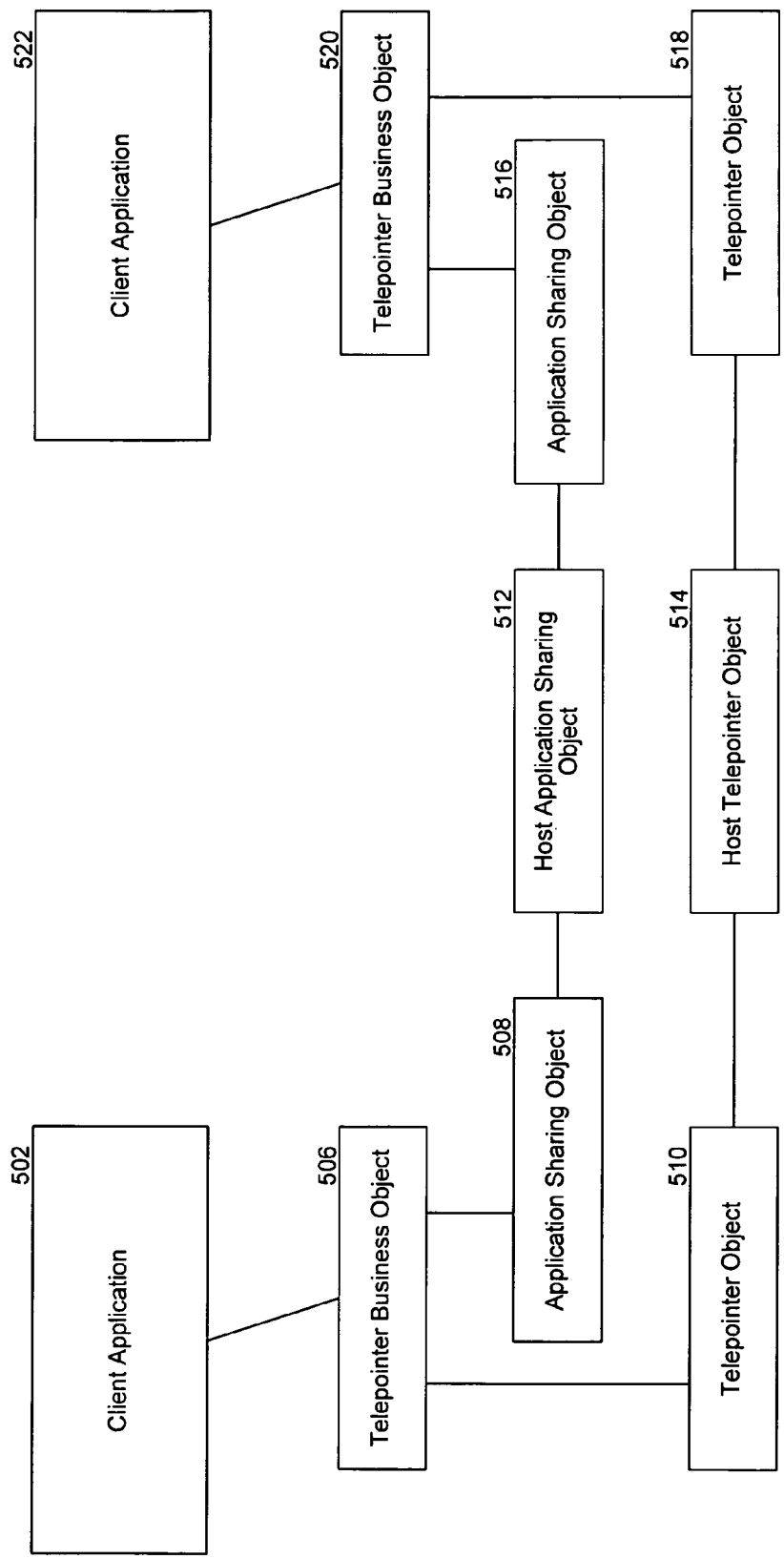
FIG. 5 is a block diagram illustrating software components that the facility may employ and how data may flow through the software components in some embodiments.

FIG. 5 is a block diagram illustrating software components that the facility may employ and how data may flow through the software components in some embodiments. A client application 502 provides mouse events to a telepointer business object 506. The telepointer business object may filter the mouse events. In some embodiments, the telepointer business object may scale the mouse events to transform coordinates employed by the client application (or computer on which it operates) into a shared coordinate system. The telepointer business object may then provide mouse events to either an application sharing object 508 or a telepointer object 510. As an example, the telepointer business object may provide mouse events relating to the shared application to the application sharing object and mouse events relating to the telepointer to the telepointer object.

The application sharing object may then provide information to a host application sharing object 512 for broadcast to other computers. Similarly, the telepointer object may then provide information to a host telepointer object 514 for broadcast to other computers. The information provided to the host objects can include the mouse events as well as other information.

Blocks 516-522 provide a reverse process for transmitting the information received by the host objects to another client application. An application sharing object 516 receives the information and provides it to a telepointer business object 520. A telepointer object 518 receives the information and provides it to the telepointer business object 520. The telepointer business object may filter events before providing them to a client application 522. Telepointer information generally flows from a participant computer to a host computer for broadcast to other participant computers.

In some embodiments, the host telepointer object may determine which colors to associate with each user. As an example, when a user moves a telepointer, highlights a region, and so forth, the host telepointer object may associate a particular color with the user performing the action and draw various user interface elements using that color. This process will be explained in more detail immediately below in relation to FIGS. 6-10.

FIGS. 6-10 are display diagrams illustrating aspects of user interface elements associated with the facility in various embodiments.

Figure 6:
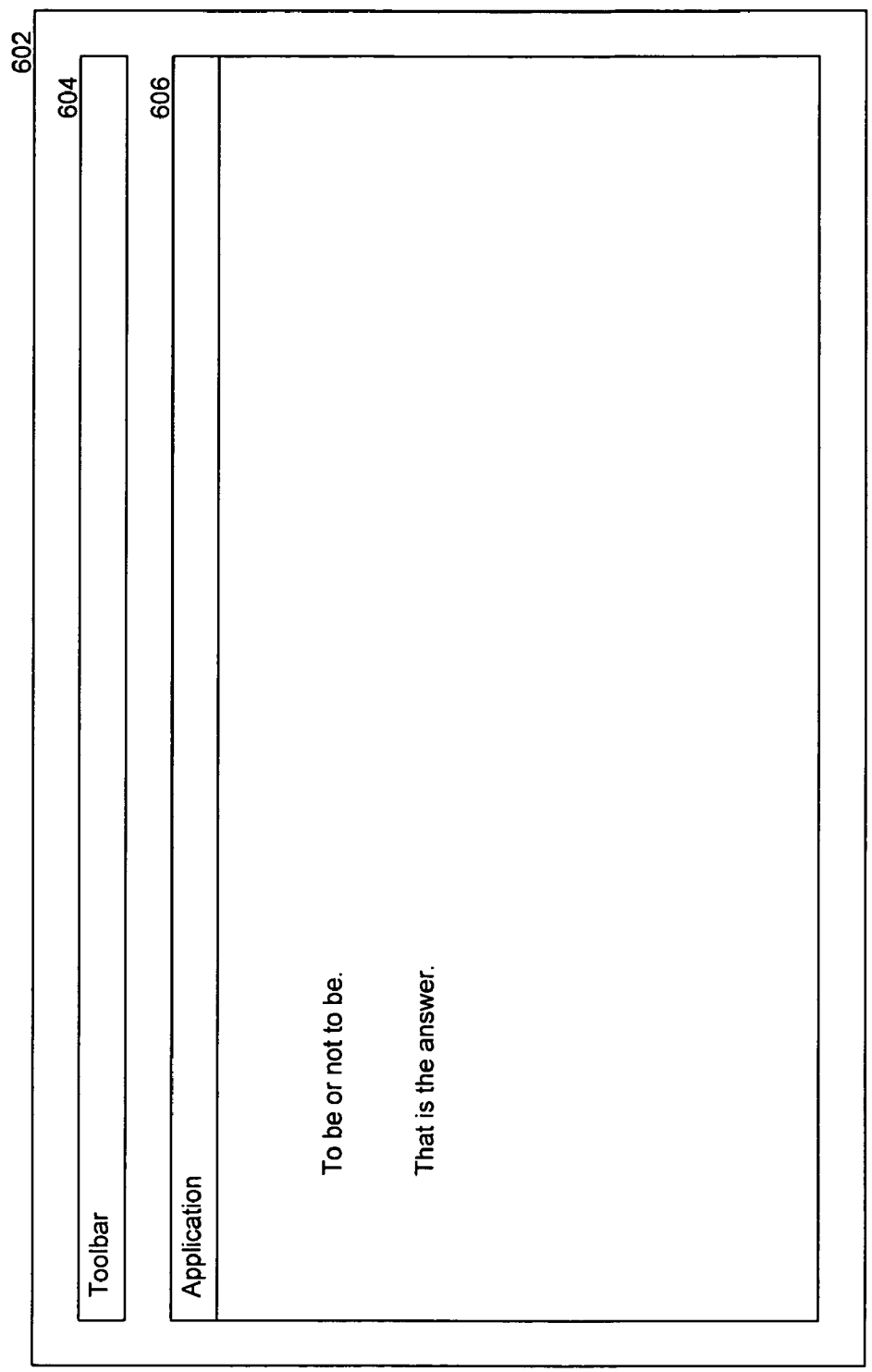
FIGS. 6-10 are display diagrams illustrating aspects of user interface elements associated with the facility in various embodiments.

FIG. 6 displays a portion 602 of an output displayed by a display device. The display device (e.g., a computer monitor) displays output of a computing device, such as a sharing computer or participant computer. The output comprises a toolbar 604 and a shared application 606. The shared application (e.g., MICROSOFT WORD) displays two lines of text. In various embodiments, the toolbar provides commands associated with the client application of the collaborative document authoring system. As examples, the toolbar provides the following commands: a host can enable or disable participants from manipulating telepointers or taking control of the sharing session; participants can turn on or off their telepointers; participants can take control; and so forth.

Figure 7:
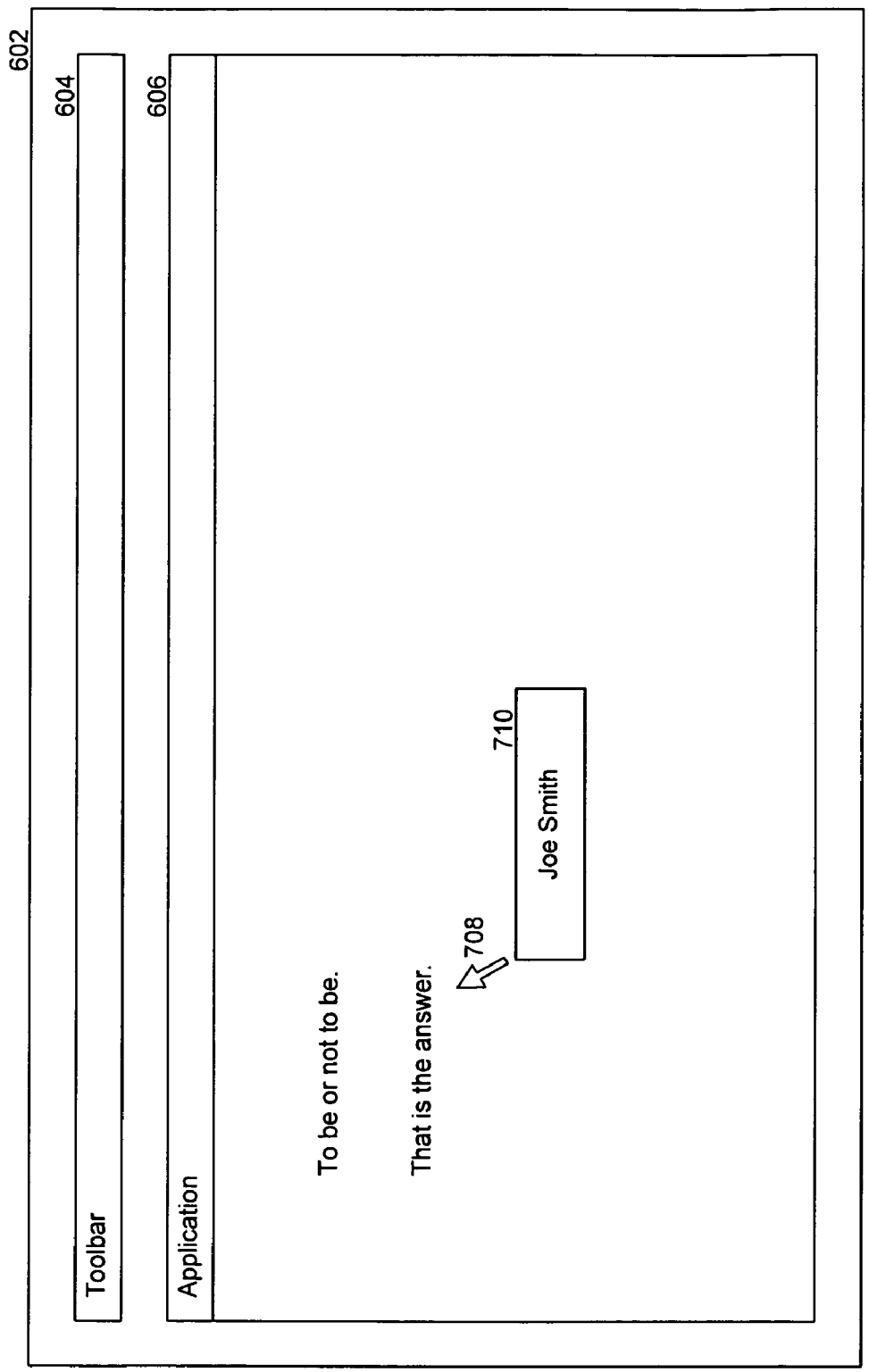

FIG. 7 is similar to FIG. 6 except that a telepointer 708 associated with a user Joe Smith is displayed. A name region 710 is additionally displayed near the telepointer that identifies the user with whom the telepointer is associated. In various embodiments, the telepointer and name region may be shaded in a color associated with an identified user. As an example, the telepointer or name region (or both) associated with Joe Smith may be shaded in the color blue. If a second telepointer associated with another user is displayed either at the same time or at some other time during the sharing session, the second telepointer and name region would be shaded in a different color. The facility will provide a different color for each participant and user. In some embodiments, users may be able to select colors. In other embodiments, the facility will automatically select a color for a user. In some embodiments, the color associated with a user may persist between sessions. In other embodiments, the facility may select colors for users depending on the sequence in which the users joined the sharing session.

Figure 8:
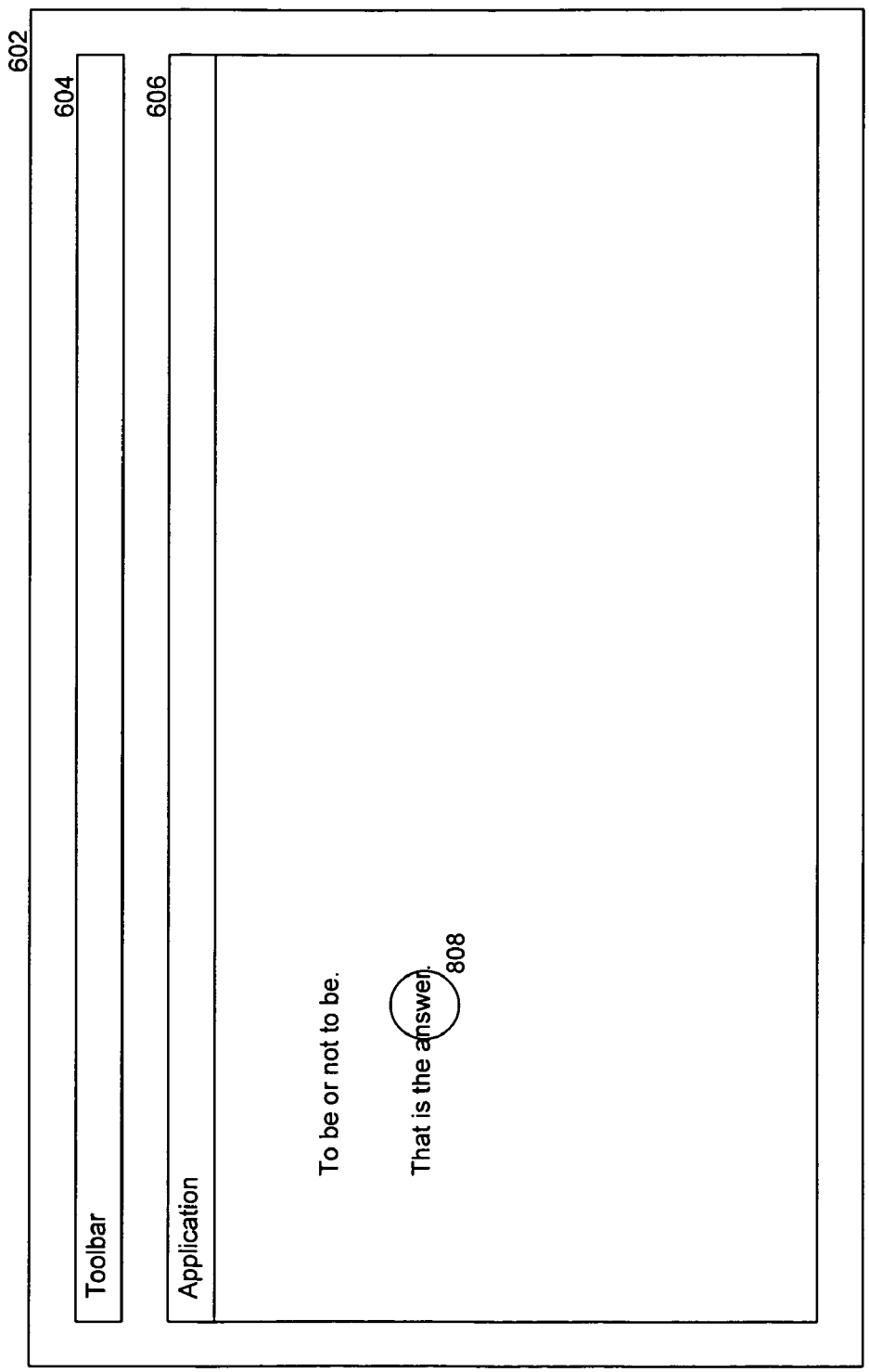
Figure 15:
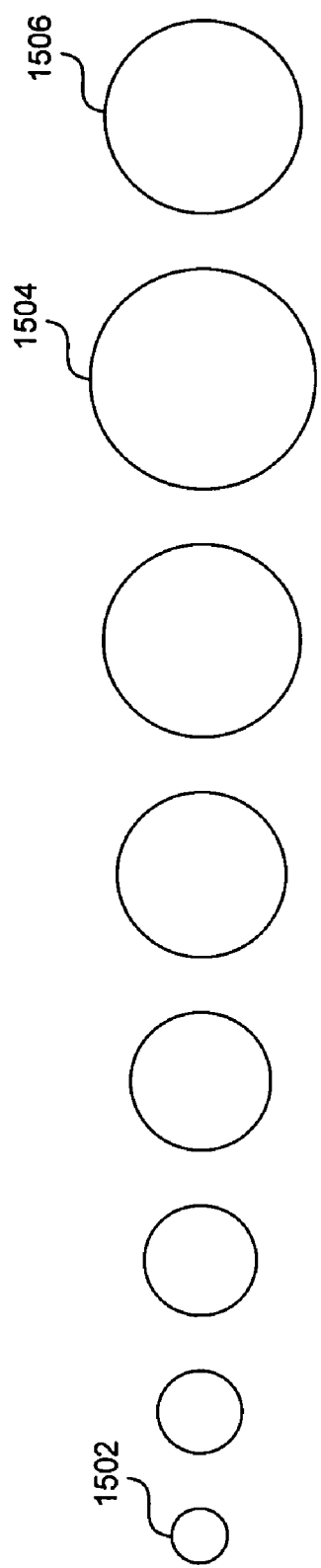
FIG. 15 is an animation sequence diagram illustrating a spot animation employed by the facility in some embodiments.

In FIG. 8, a participant has clicked in the word "answer" appearing in the application. Accordingly, the facility has drawn a spot region 808 centered at the point over which the telepointer was placed prior to clicking a mouse button or otherwise indicating to draw a spot region. The facility may draw a spot region by first displaying an animation sequence that is illustrated in FIG. 15 and described below in further detail. The spot region may be shaded in the color associated with the participant who caused the spot region to be drawn. As an example, if the color blue is associated with the participant who caused the spot region to be drawn, the spot region 808 may have a blue shade. The facility may automatically remove the spot region after a period of time. As an example, the facility may remove the spot region three seconds after it is drawn or three seconds after the participant requested it to be drawn. A telepointer and name region may continue to appear near the spot region after it is drawn (not illustrated) if the telepointer is turned on. In some embodiments, a participant can cause the spot region to be drawn without turning the telepointer on. As an example, a participant can view a mouse pointer on a participant computer and cause a spot to be drawn by clicking a mouse button. Because the telepointer is not turned on, other participants and the host would not be able to view where the participant clicked the mouse button until the facility draws the spot region.

Figure 9:
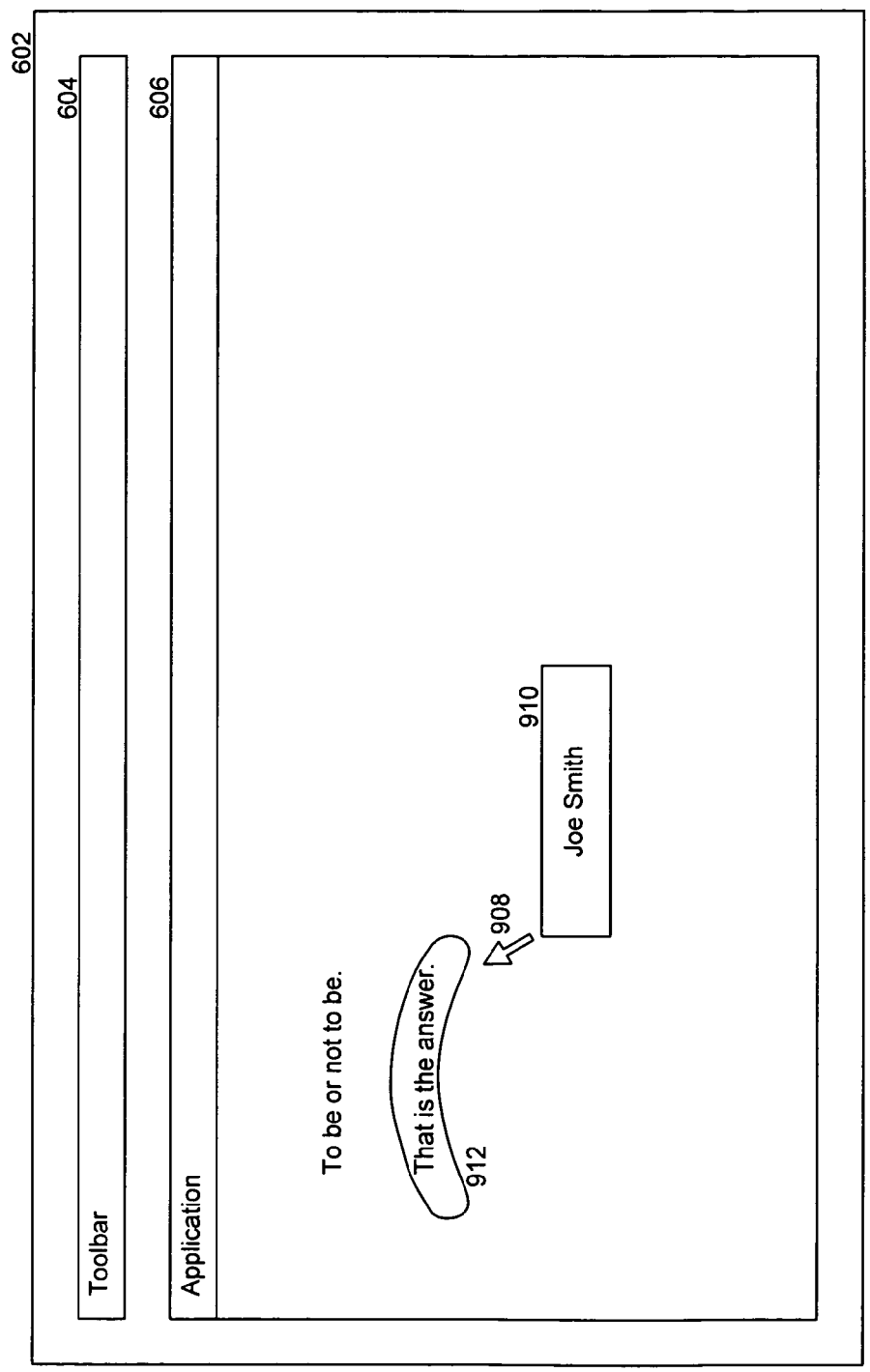

In FIG. 9, a participant has clicked a mouse button and dragged a mouse pointer while the mouse button is depressed to cause the facility to highlight a region 912. The highlighted region is centered on the path taken by the mouse pointer or telepointer 908. The facility may use the color associated with the participant's telepointer 908 or name region 910 when drawing the highlighted region. In some embodiments, a participant can cause the highlighted region to be drawn without turning the telepointer on. As an example, a participant can click a button and drag a mouse pointer on the participant computer. Because the telepointer is not turned on, other participants and the host would not be able to view where the participant clicked the mouse button until the facility highlights the region. The facility may automatically remove the highlighted region after a period of time.

Figure 10:
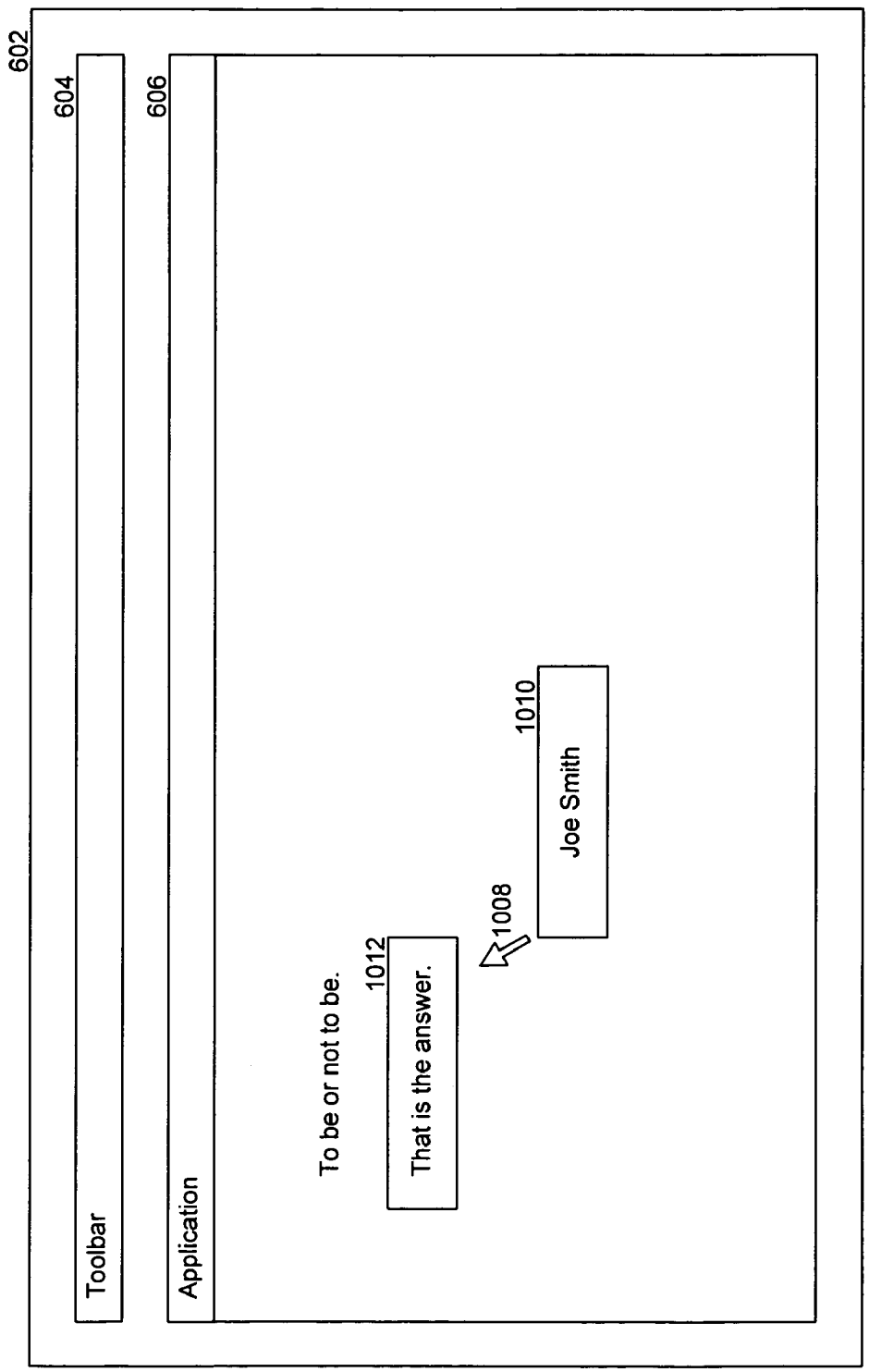

FIG. 10 illustrates an alternate embodiment. In FIG. 10, a participant has clicked a mouse button and dragged a mouse pointer while the mouse button is depressed to cause the facility to highlight a rectangular region 1012. The technique for selecting the horizontal and vertical extents and position of the rectangle are similar to the technique used in MICROSOFT PAINTBRUSH and MICROSOFT VISIO. In that technique, the participant selects a corner by clicking the mouse button, drags the mouse pointer to the position of a diagonal corner, and then releases the mouse button. The facility may use the color associated with the participant's telepointer 1008 or name region 1010 when drawing the highlighted rectangular region. In some embodiments, a participant can cause the highlighted rectangular region to be drawn without turning the telepointer on. As an example, a participant can click a button and drag a mouse pointer on the participant computer. Because the telepointer is not turned on, other participants and the host would not be able to view where the participant clicked the mouse button until the facility highlights the rectangular region. The facility may automatically remove the highlighted region after a period of time.

While the user actions associated with causing the facility to draw regions have been described herein as using a mouse and clicking a button associated with the mouse, one skilled in the art would recognize that the user actions can also be performed using other techniques, such as by using a keyboard, voice commands, joystick, stylus, etc.

Figure 11:
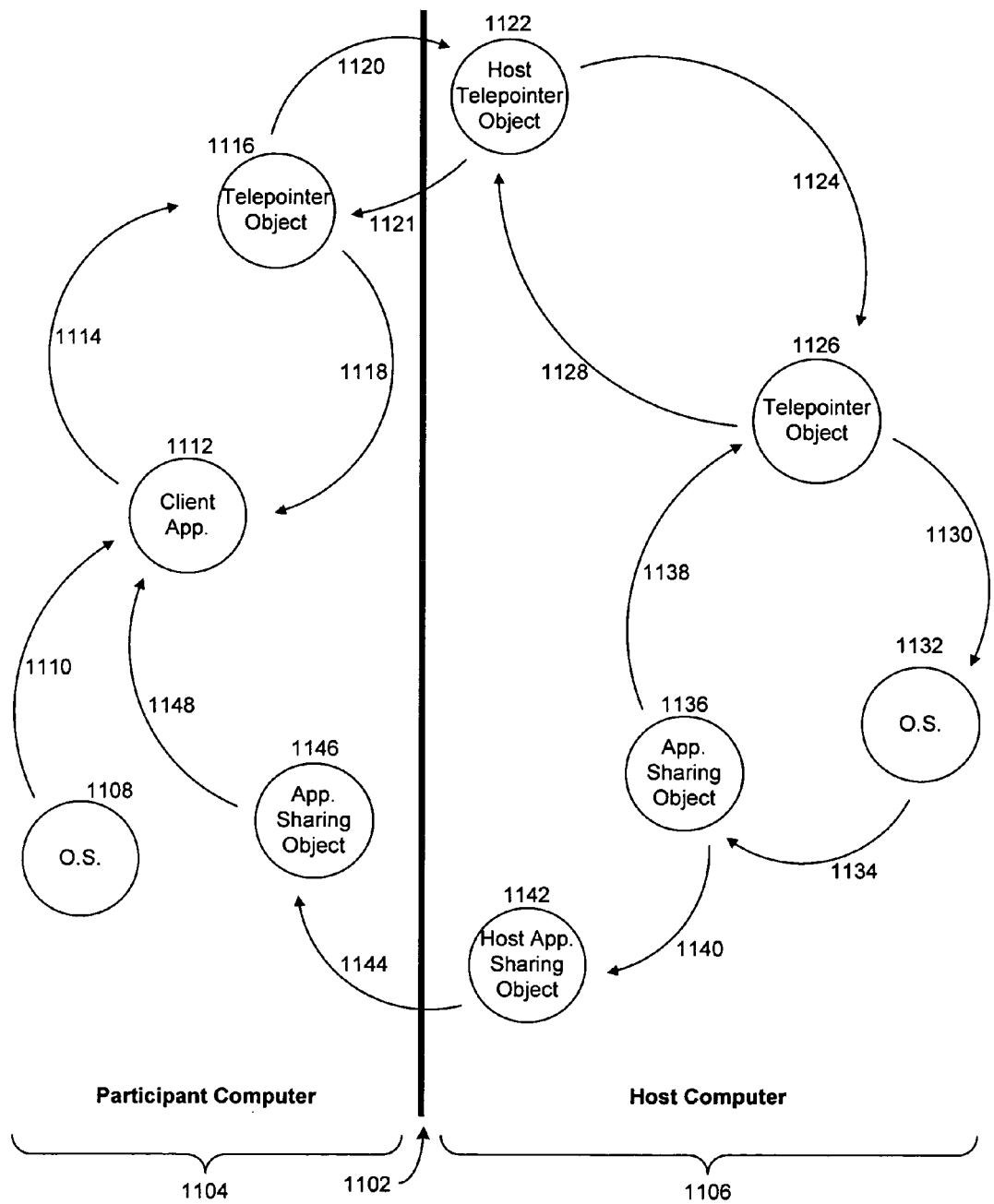
FIG. 11 is a data flow diagram illustrating how data may flow through software components associated with the facility in various embodiments.

FIG. 11 is a data flow diagram illustrating how data may flow through software components associated with the facility in various embodiments. The data flow diagram is described using nodes, such as nodes 1108 and 1112, and arcs, such as arcs 1110 and 1114. In the illustrated data flow diagram, the nodes represent software modules and the arcs represent the flows of data between the software modules. The nodes are divided by a vertical line 1102 into a set of nodes 1104 associated with a participant computing device and another set of nodes 1106 associated with a host computing device.

An operating system 1108 detects mouse events, such as movements of a mouse pointer or clicks of a mouse button, and provides 1110 indications of the detected mouse events to a client application 1112. The mouse events provided to the client application may use a coordinate system associated with the participant computing device. The client application may then scale the coordinates of the received mouse events into a coordinate system employed by the collaborative document authoring system. As an example, the operating system may indicate that the user has clicked the mouse button near pixel (10, 10). This coordinate is associated with the participant computing device. An equivalent coordinate in the collaborative document authoring system may be pixel (25, 35) because the collaborative document authoring system supports a greater pixel resolution than the participant computing device. In some embodiments, the client application employs a telepointer business object to scale the coordinates. The client application provides 1114 the scaled mouse events to a telepointer object 1116. The telepointer object may forward 1120 a filtered set of received mouse events to a host telepointer object 1122. In various embodiments, the telepointer object 1116 may send only a most recent mouse move event when no mouse click events are pending. This enables the collaborative document authoring system to reduce the amount of network traffic required to keep host computing devices and participant computing devices updated. The telepointer object may also receive 1121 mouse events from the host telepointer object, such as mouse events pertaining to other users' telepointers. The telepointer object may then scale the received mouse events into the coordinate system used by the participant computing device and provide 1118 the scaled mouse events to the client application.

The host telepointer object attaches to the received mouse events user information, such as colors, user names or other identifications, and so forth and provides 1124 this information to a telepointer object 1126 that is associated with the host computing device. In some embodiments, the host telepointer object may also filter or combine mouse events before providing the information to the telepointer object. In some embodiments, the telepointer object may acknowledge 1128 receipt of the mouse events by sending an appropriate message to the host telepointer object. The telepointer object may also perform the actions described above in relation to telepointer object 1116, such as providing mouse events originating at the host computing device for distribution to participant computing devices. The telepointer object 1126 may then scale the received mouse events (or may employ a telepointer business object to scale the mouse events) and provide 1130 the scaled mouse events to an operating system 1132 associated with the host computing device. As examples, the mouse events may indicate to move a mouse pointer, draw a region in an appropriate color, and so forth. The operating system may additionally have components associated with the collaborative document authoring system. The operating system may change 1134 the display of the host computing system based on the received mouse events. As examples, a telepointer may move, a region may be drawn, and so forth. An application sharing object 1136 detects these changes and provides 1138 information relating to mouse events to the telepointer object 1126. The application sharing object may scale the detected mouse events from a coordinate system employed by the host computing device to a coordinate system employed by the collaborative document authoring system before providing the mouse events to the telepointer object. The application sharing object also provides 1140 indications of information that has changed on the display device to a host application sharing object 1142. As an example, the application sharing object may provide an image corresponding to the portion of the image displayed on the display device that has changed.

The host application sharing object may then provide 1144 the received display device information to an application sharing object 1146 associated with a participant computing device. As an example, the host application sharing object may provide images corresponding to the portions of the image displayed on the display device that have changed. The application sharing object may then scale the received images into a coordinate system employed by the participant computing device and provide 1148 the scaled images to the client application 1112.

Thus, mouse events emanating either at participant computing devices or at the host computing device may be processed and distributed to all participant computing devices. Display changes are made at the host computing device and may be forwarded to all participant computing devices.

Figure 12:
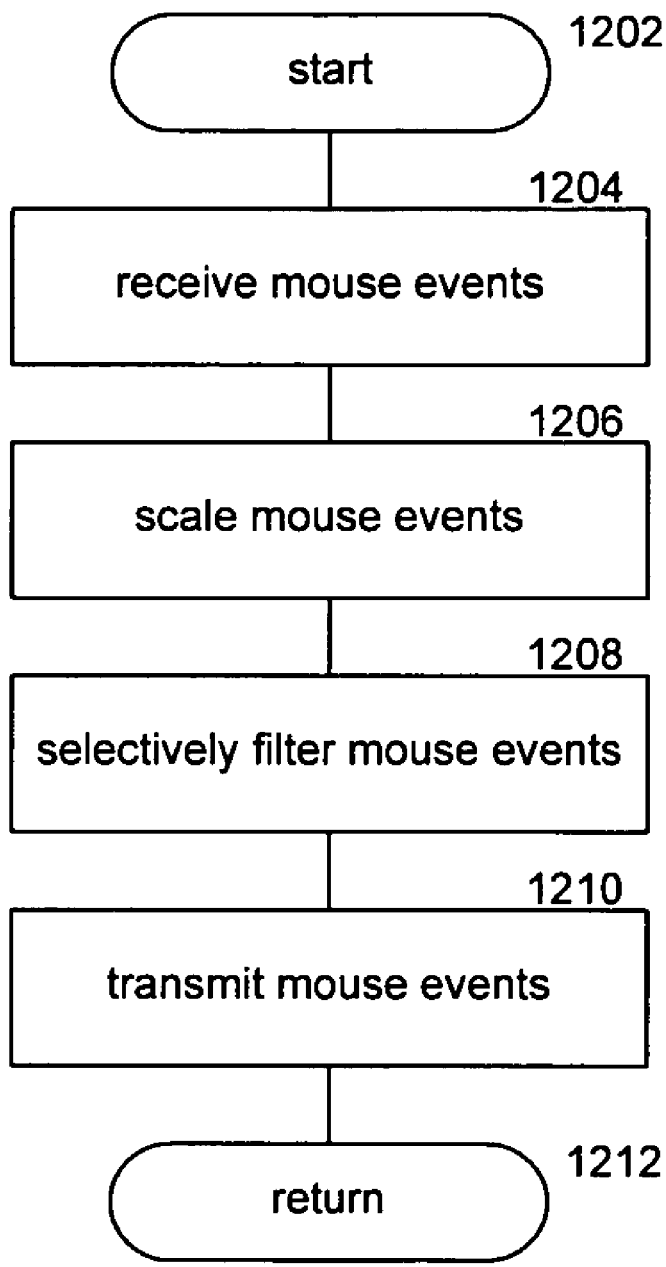
FIG. 12 is a flow diagram illustrating a transmit_mouse_events routine invoked by the facility in some embodiments.

FIG. 12 is a flow diagram illustrating a transmit_mouse_events routine invoked by the facility in some embodiments. Software components operating on a participant computing device invoke the transmit_mouse_events routine to transmit mouse events to a host computing device. The routine begins at block 1202.

At block 1204, the routine receives mouse events. The mouse events the routine receives may be in a coordinate system associated with the participant computing device. As an example, the mouse events may indicate that a mouse pointer is on or near a particular pixel. The pixel may be identified by the coordinate system employed by the participant computing device.

At block 1206, the routine scales the received mouse events to a coordinate system employed by the collaborative document authoring system. As an example, the coordinate system employed by the collaborative document authoring system may use a greater or lesser resolution than the coordinate system employed by the participant computing device.

At block 1208, the routine selectively filters mouse events. As an example, the routine may determine that when a mouse button is not being clicked, no mouse click event is pending. As a result, not all mouse move events may need to be transmitted to the host computing device because it may not be important for all users to view what path a mouse pointer took to reach where the mouse pointer presently points. In some embodiments, mouse events may not be filtered.

At block 1210, the routine transmits the scaled and filtered mouse events. As an example, the routine may transmit the mouse events to a host telepointer object associated with a host computing device.

At block 1212, the routine returns.

Figure 13:
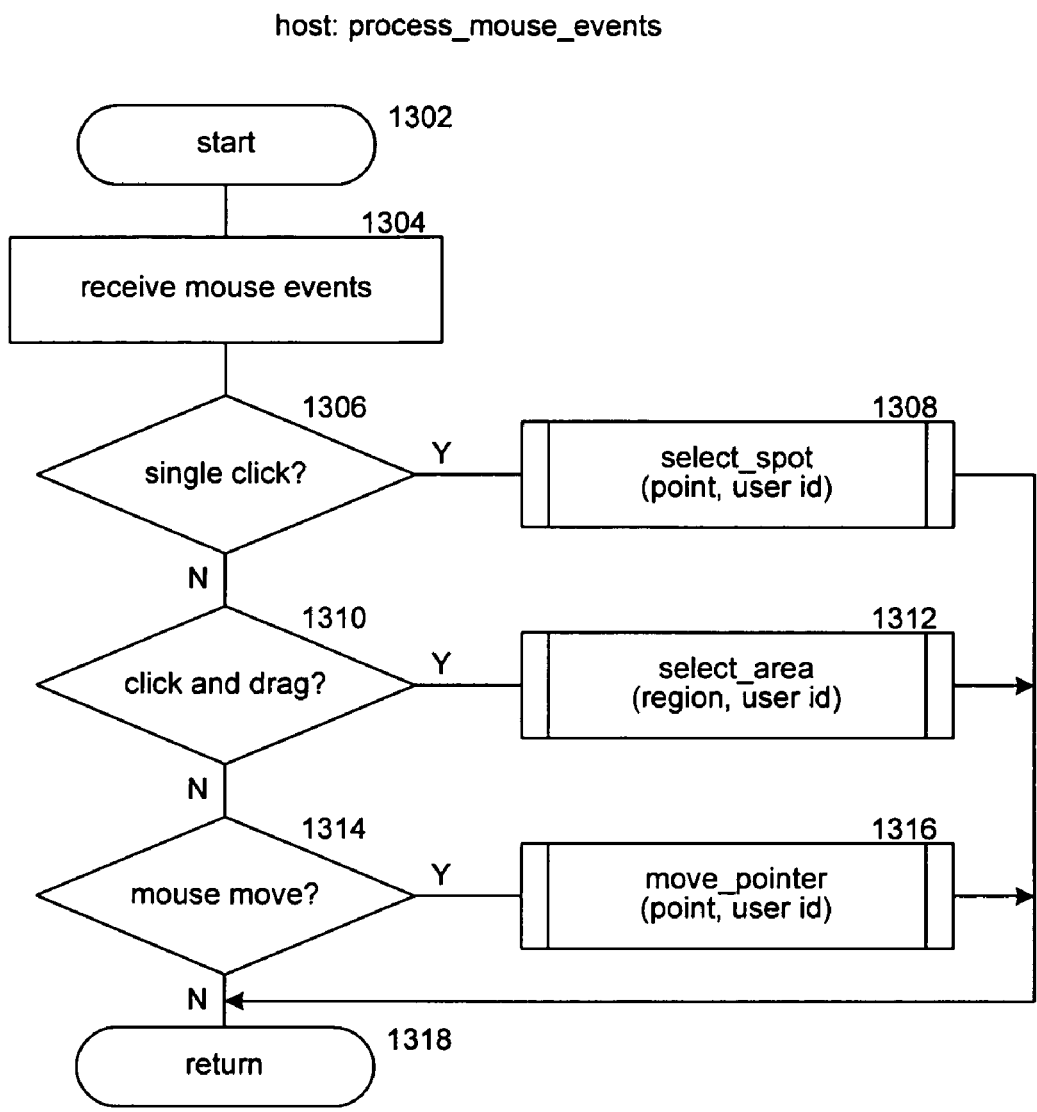
FIG. 13 is a flow diagram illustrating a process_mouse_events routine invoked by the facility in some embodiments.

FIG. 13 is a flow diagram illustrating a process_mouse_events routine invoked by the facility in some embodiments. A software component of a host computing device may invoke the process_mouse_events routine upon receiving mouse events from a software component associated with a participant computing device or a host computing device. As an example, a host telepointer object may invoke the process_mouse_events routine when it receives mouse events from a telepointer object associated with a participant computing device. The routine begins at block 1302.

At block 1304, the routine receives mouse events. The mouse events the routine receives may already have been scaled into a coordinate system employed by the collaborative document authoring system. In some embodiments, before executing the logic associated with block 1304, the routine may determine whether it has previously processed mouse events from the telepointer corresponding to the telepointer object. If it has not previously processed mouse events from the telepointer, the routine may first construct a telepointer.

At block 1306, the routine determines whether the mouse events indicate that a single click has occurred. When a single click has occurred, the routine continues at block 1308 where it invokes a select_spot subroutine. When a single click has not occurred, the routine continues at block 1310.

At block 1308, the routine invokes a select_spot subroutine to draw a spot region and provides a point at which the spot should be centered and an indication of the user who is causing the spot to be drawn. The routine then continues at block 1318.

At block 1310, the routine determines whether the mouse events indicate that a click and drag operation has been performed. A click and drag operation can be identified by a mouse button down event, followed by one or more mouse move events, and terminated by a mouse button up event. When a click and drag operation has been identified, the routine continues at block 1312 where it invokes a select_area subroutine. Otherwise, the routine continues at block 1314.

At block 1312, the routine invokes a select_area subroutine to highlight an area identified by the click and drag operation. When invoking the subroutine, the routine may provide an indication of the region and a user who performed the click and drag operation. The routine then continues at block 1318.

At block 1314, the routine determines whether the mouse events indicate mouse movement. When the mouse events indicate a mouse movement, the routine continues at block 1316 where it moves a pointer (e.g., a telepointer) associated with the user who caused the mouse move events. Otherwise, the routine continues at block 1318.

At block 1316, the routine invokes a move_pointer [per FIG. 13] subroutine to move a pointer or telepointer associated with the user who caused the mouse move events. When invoking the move_pointer [per FIG. 13] subroutine, the routine provides an indication of a point to which the pointer or telepointer should be moved along with an indication of a user who caused the mouse move events. The routine then continues at block 1318.

At block 1318, the routine returns.

Figure 14:
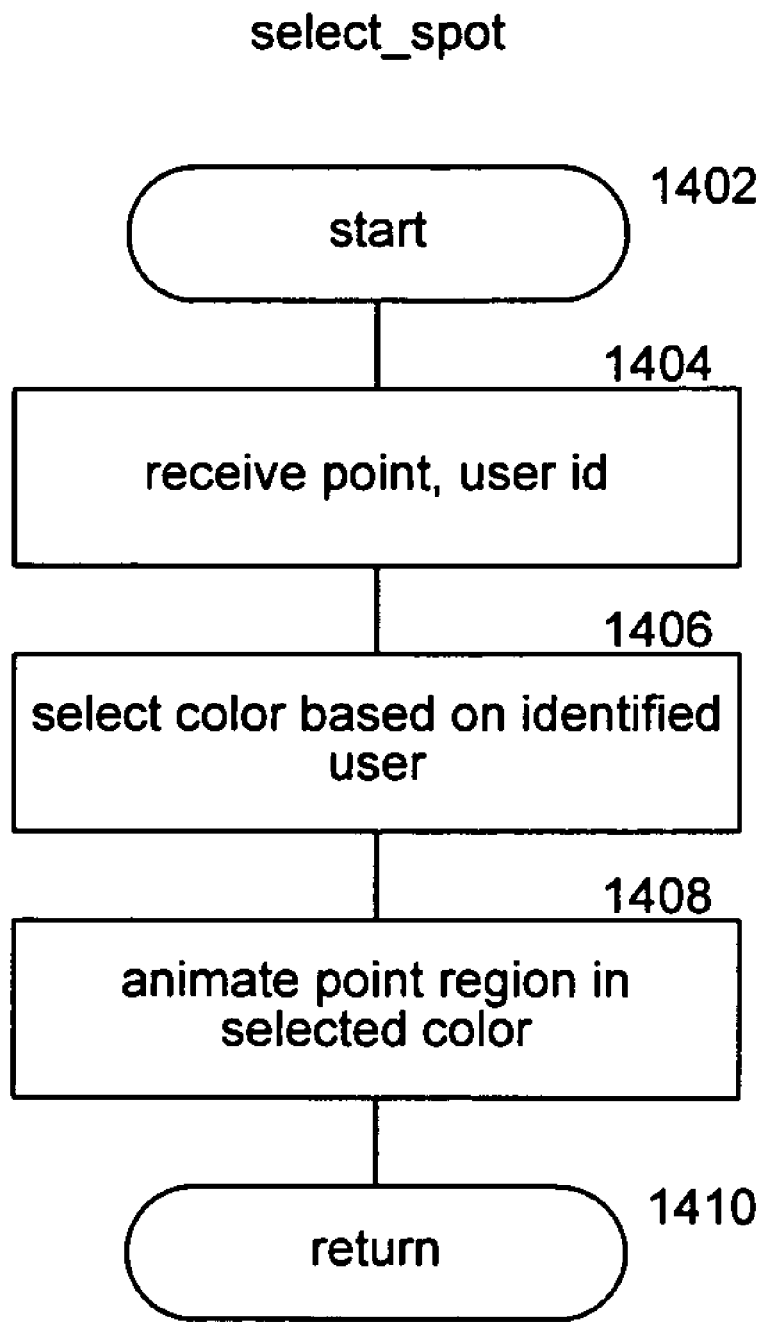
FIG. 14 is a flow diagram illustrating a select_spot routine invoked by the facility in some embodiments.

FIG. 14 is a flow diagram illustrating a select_spot routine invoked by the facility in some embodiments. The facility may invoke the select_spot routine to draw a spot region. The routine begins at block 1402.

At block 1404, the routine receives an indication of a point and a user. As an example, the routine may receive an indication of the pixel at which the spot region should be centered. In various embodiments, the routine may additionally receive an indication of a diameter or radius for the spot.

At block 1406, the routine selects the color with which to shade the spot region. In some embodiments, the routine may use the indication of the user to select a color for the spot region.

At block 1408, the routine draws the spot region at the identified point using an animation sequence that is described immediately below in relation to FIG. 15. The spot region may be animated using the selected color.

At block 1410, the routine returns.

FIG. 15 is an animation sequence diagram illustrating a spot animation employed by the facility in some embodiments. The animation sequence begins by first drawing a small spot region 1502 and then drawing progressively larger spot regions until a largest spot region 1504 followed by a smaller spot region 1506. A previously drawn spot region may be removed before a subsequent spot region is drawn. The animation sequence may last approximately 0.3 seconds, but this duration can be varied. Each spot region may be shaded using the color selected by the select_spot routine described above in relation to FIG. 14.

Figure 16:
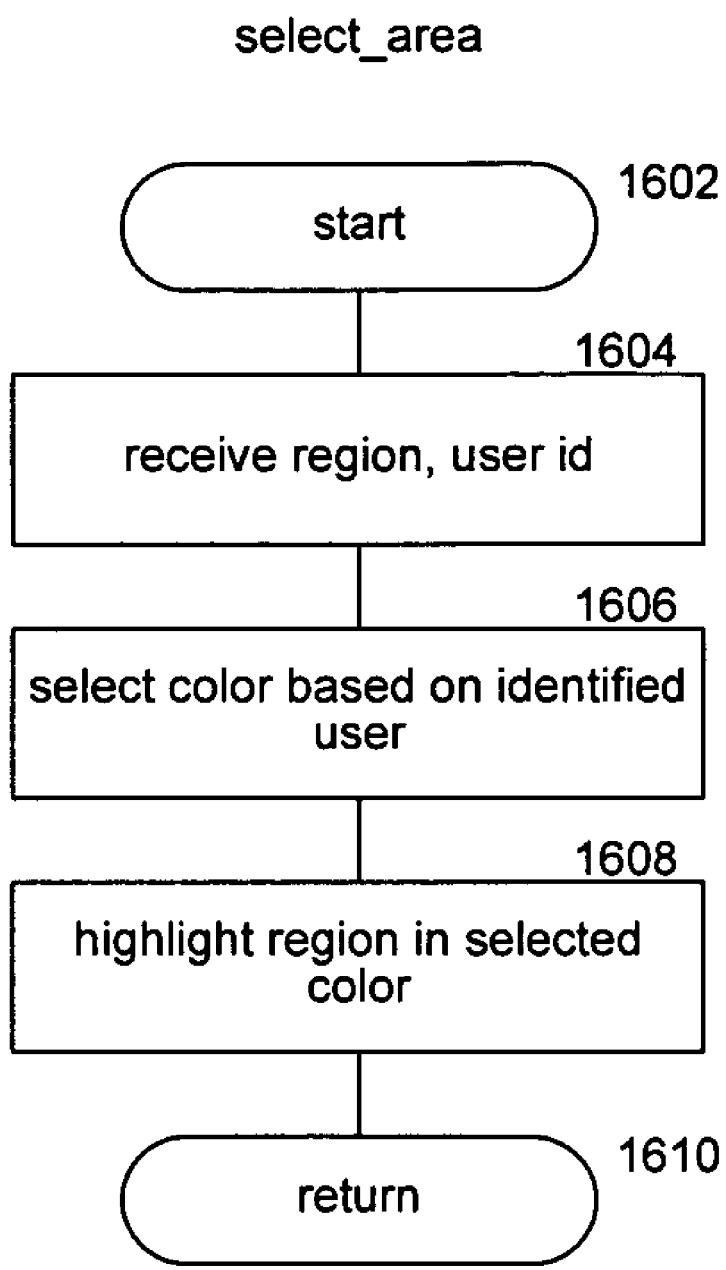
FIG. 16 is a flow diagram illustrating a select_area routine invoked by the facility in some embodiments.

FIG. 16 is a flow diagram illustrating a select_area routine invoked by the facility in some embodiments. The facility may invoke the select_area routine to highlight an area selected by the user. The routine begins at block 1602.

At block 1604, the routine receives an indication of a region and a user. The region may be indicated as a sequence of mouse move events, a rectangle, or coordinates identifying other shapes.

At block 1606, the routine selects the color that will be used to highlight the indicated region. In some embodiments, the routine may select the color based on the identified user.

At block 1608, the routine highlights the indicated region using the selected color.

At block 1610, the routine returns.

Figure 17:
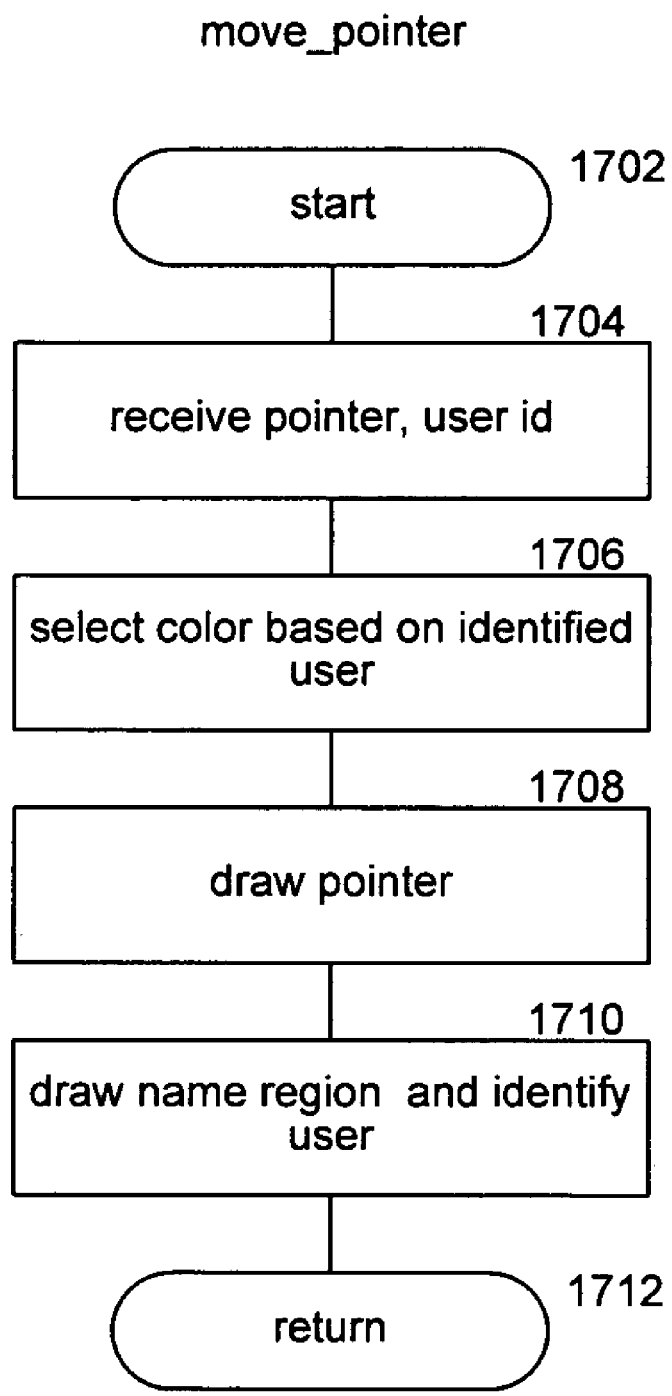
FIG. 17 is a flow diagram illustrating a move_pointer routine invoked by the facility in some embodiments.

FIG. 17 is a flow diagram illustrating a move_pointer routine invoked by the facility in some embodiments. The facility may invoke the move_pointer routine to move at a host computing device a pointer or telepointer associated with a user. The routine begins at block 1702.

At block 1704, the routine receives an indication of a pointer (or telepointer) and a user. In some embodiments, the routine only receives an indication of a user and can determine which pointer is associated with the indicated user.

At block 1706, the routine selects a color for the pointer or telepointer based on the indicated user.

At block 1708, the routine draws a pointer or telepointer associated with the identified user. In some embodiments, the pointer or telepointer is drawn in the selected color. In some embodiments, the pointer or telepointer is shaded in the selected color. In some embodiments, a previously drawn telepointer is removed from the display.

At block 1710, the routine draws a name region near the pointer or telepointer and also draws an indication of the indicated user. In some embodiments, the name region is shaded in the selected color.

At block 1712, the routine returns.

Figure 18:
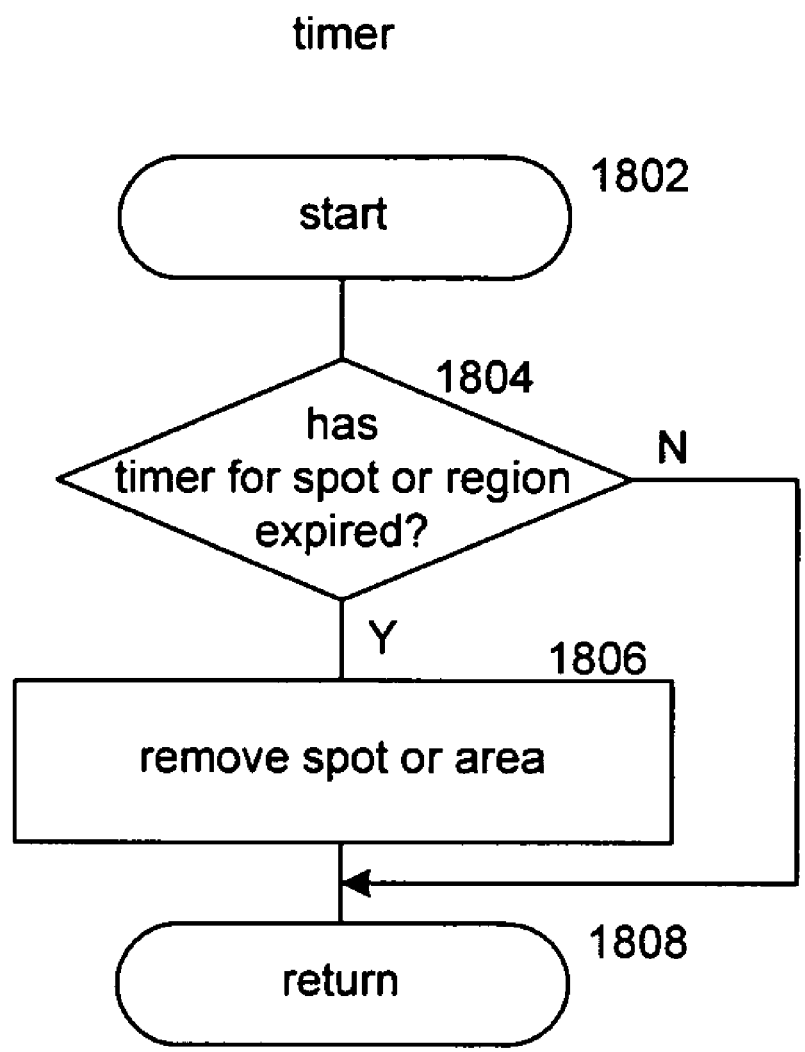
FIG. 18 is a flow diagram illustrating a timer routine invoked by the facility in some embodiments.

FIG. 18 is a flow diagram illustrating a timer routine invoked by the facility in some embodiments. The facility may invoke the timer routine for each spot or highlighted region that it draws. The routine begins at block 1802.

At block 1804, the routine determines whether the timer for the spot or highlighted region has expired. If the timer has expired, the routine continues at block 1806. Otherwise, the routine continues at block 1808.

At block 1806, the routine removes the spot or region. As an example, the routine may "fade" the region out by performing a progressive alpha blending operation in which the image behind the region is progressively provided more weight than the shading until the shading is completely removed.

At block 1808, the routine returns.

Those skilled in the art will appreciate that the blocks illustrated in FIGS. 12-14 and 16-18 and described above may be altered in a variety of ways. For example, the order of the blocks and their associated logic may be rearranged, additional logic may be performed in parallel, shown blocks may be omitted, or other blocks and associated logic may be included, and so forth.

From the foregoing, it will be appreciated that specific embodiments of the invention have been described herein for purposes of illustration, but that various modifications may be made without deviating from the spirit and scope of the invention. As an example, a keyboard, stylus, voice, or other input device may be used instead of a mouse. As another example, instead of varying colors to identify users, the facility may vary shapes, indicate user identifications, and so forth. Accordingly, the invention is not limited except as by the appended claims. As another example, each participant computer could receive data relating to the regions and draw the regions.

We claim:

1. A method performed by a computer system for identifying on multiple computing devices a region identified by a user of a computing device, comprising:

receiving at a host computing device a request to establish a sharing session with a participant computing device, the request made by a client application executing on the host computing device;

establishing a sharing session wherein an application executing the host computing device that is different from the client application establishes the sharing session between at least the host computing device and the participant computing device, wherein the sharing session shares a document opened by the client application;

receiving at the host computing device an indication from the participant computing device to identify a region to users participating in the sharing session, the region identified by a user at the participant computing device and specifying a portion of the shared document;

drawing, by the client application that requested to establish the sharing session, the identified region on a display device associated with the host computing device before the region is drawn on the participant computing device; and causing the identified region to be drawn on a display device associated with the participant computing device after the identified region is drawn on the display device associated with the host computing device.

2. The method of claim 1 wherein the region is a spot region.

3. The method of claim 2 wherein the indication is a mouse click event.

4. The method of claim 2 wherein the indication is a selection of a point.

5. The method of claim 2 wherein the causing includes sending a portion of an image that is displayed on the display device associated with the host computing device so that the participant computing device can update the image it displays.

6. The method of claim 1 wherein the drawing includes identifying a user of the participant computing device.

7. The method of claim 6 wherein the identifying includes associating a color with the user, and the drawing is in the associated color.

8. The method of claim 1 wherein the participant computing device draws the identified region after the host computing device draws the identified region even though the user identified the region at the participant computing device.

9. A non-transitory computer-readable storage device storing computer-executable instructions, the instructions comprising:
instructions for receiving at a host computing device a request to establish a sharing session with a participant computing device, the request made by a client application executing on the host computing device;
instructions for establishing a sharing session wherein an application executing at the host computing device that is different from the client application establishes the sharing session between at least the host computing device and the participant computing device, wherein the sharing session shares a document opened by the client application;
instructions for receiving at the host computing device an indication from the participant computing device to identify a region to users participating in the sharing session, the region identified by a user at the participant computing device and specifying a portion of the shared document;
instructions for drawing, by the client application that requested to establish the sharing session, the identified region on a display device associated with the host computing device before the region is drawn on the participant computing device; and
instructions for causing the identified region to be drawn on a display device associated with the participant computing device after the identified region is drawn on the display device associated with the host computing device.

10. The method of claim 9 wherein the region is a spot region.

11. The method of claim 10 wherein the indication is a mouse click event.

12. The method of claim 10 wherein the indication is a selection of a point.

13. The method of claim 10 wherein the causing includes sending a portion of an image that is displayed on the display device associated with the host computing device so that the participant computing device can update the image it displays.

14. The method of claim 9 wherein the drawing includes identifying a user of the participant computing device.

15. The method of claim 14 wherein the identifying includes associating a color with the user, and the drawing is in the associated color.

16. A system, comprising:
a processor and memory;
a component configured to receive at a host computing device a request to establish a sharing session with a participant computing device, the request made by a client application executing on the host computing device;
a component configured to establish a sharing session wherein an application executing at the host computing device that is different from the client application establishes the sharing session between at least the host computing device and the participant computing device, wherein the sharing session shares a document opened by the client application;
a component configured to receive at the host computing device an indication from the participant computing device to identify a region to users participating in the sharing session, the region identified by a user at the participant computing device and specifying a portion of the shared document;
a component configured to draw, by the client application that requested to establish the sharing session, the identified region on a display device associated with the host computing device before the region is drawn on the participant computing device; and
a component configured to cause the identified region to be drawn on a display device associated with the participant computing device after the identified region is drawn on the display device associated with the host computing device.

* * * * *

UNITED STATES PATENT AND TRADEMARK OFFICE
CERTIFICATE OF CORRECTION

PATENT NO.         : 7,996,776 B2                                         Page 1 of 1
APPLICATION NO.    : 11/364575
DATED              : August 9, 2011
INVENTOR(S)        : Parker et al.

It is certified that error appears in the above-identified patent and that said Letters Patent is hereby corrected as shown below:

In column 14, line 49, in Claim 1, after "executing" insert -- at --.

Signed and Sealed this
Twenty-fifth Day of October, 2011

David J. Kappos
*Director of the United States Patent and Trademark Office*